United States Patent
Maiya et al.

(10) Patent No.: US 9,047,502 B2
(45) Date of Patent: Jun. 2, 2015

(54) AUTOMATIC SYSTEM FOR JUDGING QUALITY OF CELL

(75) Inventors: Nobuhiko Maiya, Yokohama (JP); Yasujiro Kiyota, Tokyo (JP); Takayuki Uozumi, Machzda (JP); Hirofumi Shiono, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 1075 days.

(21) Appl. No.: 12/001,872

(22) Filed: Dec. 13, 2007

(65) Prior Publication Data

US 2009/0154788 A1 Jun. 18, 2009

(51) Int. Cl.
G06K 9/00 (2006.01)

(52) U.S. Cl.
CPC .................................. *G06K 9/00127* (2013.01)

(58) Field of Classification Search
USPC ............................ 328/128, 170, 133; 318/640
See application file for complete search history.

(56) References Cited

U.S. PATENT DOCUMENTS

| | | | |
|---|---|---|---|
| 5,162,204 A * | 11/1992 | Matsuzaki et al. | 435/29 |
| 6,330,350 B1 * | 12/2001 | Ahn et al. | 382/134 |
| 6,631,331 B1 * | 10/2003 | Sabry et al. | 702/19 |
| 6,956,568 B2 * | 10/2005 | Maekawa et al. | 345/420 |
| 7,050,620 B2 * | 5/2006 | Heckman | 382/133 |
| 7,369,696 B2 * | 5/2008 | Arini et al. | 382/133 |
| 7,970,549 B1 * | 6/2011 | Catalano et al. | 702/19 |
| 2004/0029213 A1 * | 2/2004 | Callahan et al. | 435/40.5 |
| 2004/0117124 A1 * | 6/2004 | Kiros et al. | 702/19 |
| 2005/0265588 A1 * | 12/2005 | Gholap et al. | 382/128 |
| 2006/0039593 A1 * | 2/2006 | Sammak et al. | 382/133 |
| 2007/0016373 A1 * | 1/2007 | Hunter et al. | 702/19 |
| 2007/0054350 A1 * | 3/2007 | Walker, Jr. | 435/34 |

FOREIGN PATENT DOCUMENTS

| | | |
|---|---|---|
| JP | 2001-211896 A | 8/2001 |
| JP | 2004-301729 A | 10/2004 |
| JP | 2006-333710 A | 12/2006 |

OTHER PUBLICATIONS

Japanese Office Action dated Oct. 26, 2010 in counterpart Japanese Application No. 2005-158499.
Shinichi Igarashi et al., "Basic and clinical study on new development of cytological diagnosis", Akita Journal of Rural Medicine, vol. 50, No. 1, pp. 1-4, 2004.

* cited by examiner

*Primary Examiner* — Jack Berman
*Assistant Examiner* — Jason McCormack
(74) *Attorney, Agent, or Firm* — Holtz, Holtz, Goodman & Chick PC

(57) ABSTRACT

An automatic culture device 1 having an automatic quality determination system is equipped with an analysis program 12. The analysis program 12 extracts cell characteristics from a captured image of a cell by driving a characteristic quantity extraction program 13, which is an image processing program for extracting characteristics (characteristic quantities) of this cell. The quality of the cell is then determined from the extracted characteristic or a combination of a plurality of characteristics by driving an identification program 15 that determines the quality of a cell. This allows cell quality determination to be automated.

11 Claims, 2 Drawing Sheets

AUTOMATIC SYSTEM FOR JUDGING QUALITY OF CELL

TECHNICAL FIELD

The present invention relates to an automatic system for determining the quality of a cell.

BACKGROUND ART

Conventional cell culture apparatuses have not had an automatic image analysis function for determining whether or not the culture state is good from an image of a cell. Therefore, the experimenter himself had to take the culture container out of the culture apparatus, and observe the state of cell growth by utilizing a separately installed microscope.

Furthermore, in the culture of cells, there may be cases in which the characteristics of the cultured cells change over generations (cases in which subspecies are generated), so that it is known as a precaution that subspecies will proliferate. To prevent this from happening, cell culture experimenters had to examine past publications or ask cell suppliers (such as cell banks) whether the cells the experimenters were using had lost the basic characteristics of those cells, whether their shape had been retained, and so forth, and they had to be on the lookout for changes in the cells. In order to prevent this, furthermore, it was necessary that cells obtained from a cell bank or the like be propagated right away, that these resulting cells be put in cold storage at an early stage, and that fresh cells be then dissolved and propagated, compared, and checked every few months.

DISCLOSURE OF THE INVENTION

The field of biotechnological research has become more diverse in recent years, so that education in specialized fields takes up more time, and education related to cell culture is not taken as seriously. Therefore, there is a growing number of researchers who are unable to accurately determine whether cultured cells are good or not. Furthermore, in cases where a large quantity of cells or many types of cell are cultured, it takes up much of an experimenter's time to determine the quality of individual cells. Moreover, since the determination criteria are not clear, there is variance in the quality of cultured cells from one experimenter to another, which poses a problem in the reproducibility of experiments in which cultured cells are used.

The present invention was devised in light of such circumstances, and it is an object of the present invention to provide an automatic system for determining the quality of a cell, with which the automated determination of cell quality can be realized.

The first means used to solve the problems described above is an automatic system for determining the quality of a cell, comprising:

a plurality of characteristic extraction means that extract the characteristics of a captured image of the cell;

a plurality of quality determination means that determine the quality of the cell from an extracted characteristic or from a combination of a plurality of characteristics;

an analysis recipe storage mean that stores combinations of the characteristic extraction means and the quality determination means as analysis recipes, which are used according to the type of the cell; and an analysis mean that selects the analysis recipe corresponding to the type of the cell from the analysis recipe storage mean, drives the characteristic extraction mean stored in that analysis recipe, extracts a characteristic of the cell, and then drives the quality determination mean stored in that analysis recipe and determines the quality of the cell.

The second means used to solve the problems described above is an automatic system for determining the quality of a cell, comprising:

a characteristic extraction mean that extracts a characteristic of a captured image of the cell;

a plurality of quality determination means that determine the quality of the cell from an extracted characteristic or from a combination of a plurality of characteristics;

an analysis recipe storage mean that stores, according to the type of the cell, combinations of the characteristic to be extracted by the characteristic extraction mean and the quality determination means to be used; and an analysis mean that selects the analysis recipe corresponding to the type of the cell from the analysis recipe storage mean, transfers the characteristic to be extracted by the characteristic extraction mean stored in that analysis recipe to the characteristic extraction mean, extracts a characteristic of the cell, and then drives the quality determination mean stored in that analysis recipe and determines the quality of the cell.

The third means used to solve the problems described above is the first or second means, wherein the analysis recipes stored in the analysis recipe storage mean can be rewritten and/or updated.

The fourth means used to solve the problems described above is the first or second means, wherein the characteristic extraction mean comprises a characteristic quantity extraction program, and is used to extract a characteristic quantity from an image of the cell, and the quality determination mean comprises an identification program, and is used to determine the quality of the cell from an extracted characteristic quantity of the cell, or a combination of a plurality of these characteristic quantities.

The fifth means used to solve the problems described above is the first or second means, wherein the characteristic is the growth state, the number of cells, the size of the cells, a characteristic of the external shape of the cell, the adhesion between cells, bondability between adjacent cells, the number of nuclei, the shape of the nuclei, the size of the nuclei, the number of nucleoli, the size of nucleoli, the concentration of nucleoli, the amount of cytoplasmic granules, the brightness of cytoplasmic granules, the size of vacuoles, the number of vacuoles, the shape of cytoplasmic protrusions, the occupied surface area, or the crowding situation.

BEST MODE FOR CARRYING OUT THE INVENTION

Figure 1:
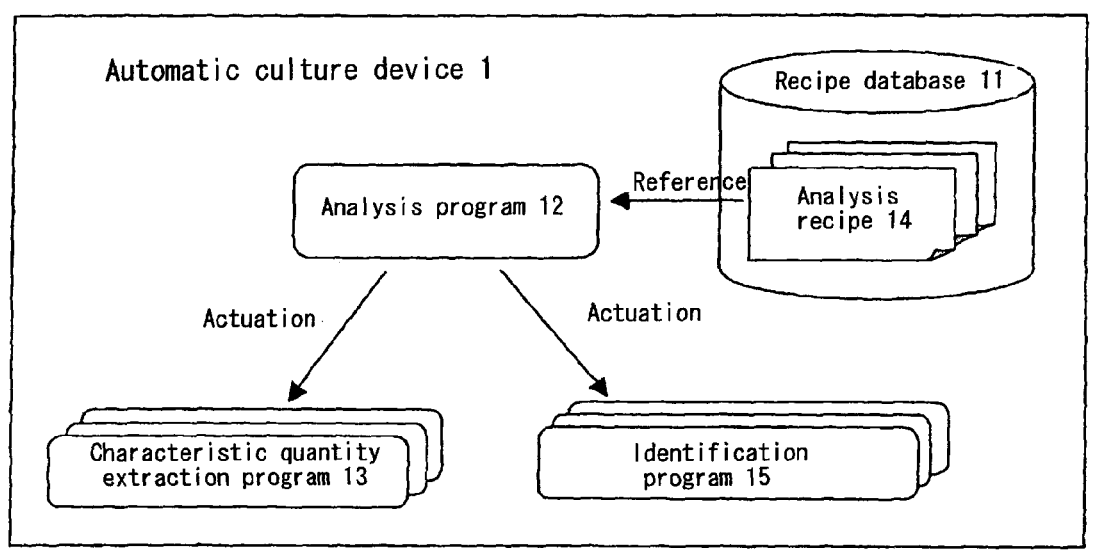
FIG. 1 is a diagram showing an outline of the automatic system for determining the quality of a cell constituting one working configuration of the present invention.

The automatic system for determining the quality of a cell according to a working configuration of the present invention will be described below using the drawings. FIG. 1 is a diagram showing an outline of the automatic system for determining the quality of a cell constituting one working configuration of the present invention. The term "characteristic quantity" will be used in the following description. The reason for this is that a characteristic is expressed as a quantity in most cases. However, these "characteristic quantities" are a concept that encompasses characteristics not expressed as a quantity (such as whether or not a certain characteristic applies).

An automatic culture device 1 having an automatic quality determination system is equipped with an analysis program 12. The analysis program 12 extracts cell characteristics from a captured image of a cell by driving a characteristic quantity extraction program 13, which is an image processing program for extracting characteristics (characteristic quantities). The quality of the cell is then determined from the extracted characteristic or a combination of a plurality of characteristics by driving an identification program 15 that determines the quality of a cell.

The characteristic quantity to be extracted from the captured image of the cell depends on the type of cell, but includes the growth state (single, colony formation, sheet-like), the number of cells, the size of the cells, a characteristic of the external shape of the cell (spherical, foam-shaped, jagged shape), the adhesion between cells, bondability between adjacent cells, the number of nuclei, the shape of the nuclei, the size of the nuclei, the number of nucleoli, the size of the nucleoli, the concentration of the nucleoli, the amount of cytoplasmic granules, the brightness of the cytoplasmic granules, the size of the vacuoles, the number of vacuoles, the shape of the cytoplasmic protrusions (number, length, thickness), the occupied surface area, the crowding situation, and so forth.

These characteristics are extracted by suitably using an existing image processing program. For instance, the size of the nucleus can be extracted by Laplacian edge extraction of an image, or by texture analysis using a histogram characteristic quantity. Furthermore, with regard to the number of nuclei, when a Fourier transform is performed, for example, the spectral amplitude of the high-frequency component is different inside and outside a nucleus, so that the number of nuclei can be determined by extracting the region of the nuclei.

Moreover, when cytoplasmic protrusions are observed with a phase contrast microscopy system, the portion of cytoplasmic protrusions is seen as black and raised-up. Therefore, if binarization is performed near background gradation, after which salt and pepper noise is removed, then just the portion of cytoplasmic protrusions can be extracted. The "average length of the cytoplasmic protrusions" can be measured by finding the average length value of this straight line portion.

In addition, when observation is made with a phase contrast microscopy system of bright contrast, it is possible to separate the gradation of the background and the cells. Therefore, a silhouette of a cell can be extracted by binarizing at a pre-measured background threshold, and then removing salt and pepper noise. For connected components, the "complexity" is calculated, and anything with complexity over a certain threshold is removed as a dead cell. Furthermore, any linked images that are clearly larger than a reference size (such as three to four times larger) are considered to be clumps of a plurality of cells, an image skeleton is extracted, this is used as a starting point to divide up the image, and each division is considered to be an individual cell image. Finally, the cell size can be found by finding the surface area of connected components.

In this working configuration, a characteristic quantity extraction program 13 is prepared for each of these characteristics, and which characteristic quantity extraction program 13 will be used is stored in an analysis recipe 14 kept in a recipe database 11. An analysis recipe 14 is created for each cell. Specifically, it is not necessary to extract all of these characteristics for all of the cells, and only those characteristics needed to determine quality should be extracted according to the type of cell. The analysis recipe 14 stores only the characteristic quantity extraction programs 13 for extracting the characteristic quantities required for determining quality.

If this is done, in cases where new cells are added as objects of determination, or a new standard is adopted for determining quality, the extracted characteristic quantity can be determined or updated merely by rewriting the analysis recipe 14. Moreover, in cases where it becomes necessary to extract a new characteristic, this can be handled by adding another characteristic quantity extraction program 13.

When the characteristics required for quality determination (this may be just one characteristic, but in most cases, it is a combination of a plurality of characteristics) are extracted in this manner, the analysis program 12 refers to the analysis recipe 14, and launches the identification program 15 stored therein. The identification program 15 is used to determine the quality of a cell from an extracted characteristic or from a combination of a plurality of characteristics, but usually one is set according to the cell to be examined. It is also conceivable, however, that a common identification program 15 can be used for a plurality of types of cell. In this case, there is no need to produce an identification program 15 for every cell, and the fact that a common identification program 15 will be used is merely stored in the analysis recipe 14 with respect to each cell.

The identification program 15 determines the quality of a cell by using a statistical analysis means such as multiple classification analysis, or a pattern recognition algorithm such as a neural network.

Figure 2:
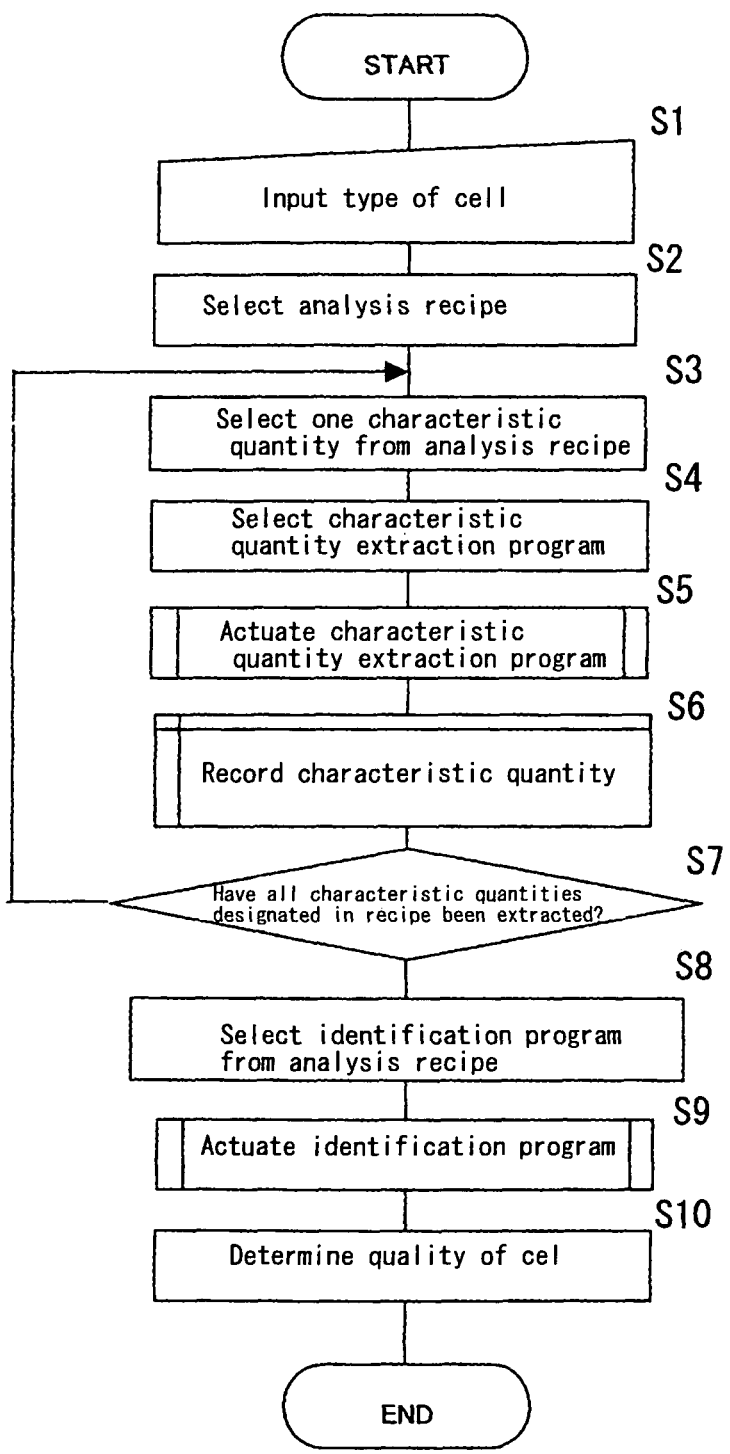
FIG. 2 is a flowchart summarizing the operation of the automatic system for determining the quality of a cell.

FIG. 2 is a flowchart summarizing the operation of the automatic system for determining the quality of a cell described above. First, the type of cell is manually input in step S1. Then, the automatic quality determination system selects an analysis recipe 14 corresponding to the type of cell in step S2. Then, in step S3, one of the characteristic quantities stored in the analysis recipe is selected. Then, in step S4, the characteristic quantity extraction program 13 corresponding to this quantity is selected, and is launched in step S5. The characteristic quantity extraction program 13 thereupon extracts and records a characteristic quantity (step S6). In step S7, it is determined whether or not all of the characteristic quantities stored in the analysis recipe 14 have been detected, and if any are undetected, the flow returns to step S3.

If all of the characteristic quantities stored in the analysis recipe 14 have been extracted, the flow moves on to step S8, the identification program 15 stored in the analysis recipe 14 is selected, and this program is launched in step S9. The quality of the cell is then determined by the operation of the identification program 15 (step S10).

In the above working configuration, furthermore, the characteristic quantity extraction programs 13 were produced according to the characteristic quantities to be extracted. However, the same effect can be obtained by making it possible for all of the characteristic quantities to be extracted with the use of just one characteristic quantity extraction program 13, and causing the extraction processing of those characteristic quantities not stored in the analysis recipe 14 to be bypassed. Furthermore, it would also be possible for a single characteristic quantity extraction program 13 to extract a plurality of compiled characteristic quantities (such as the number and size of cells, and the number and size of vacuoles) at the same time. In this case, the system may be devised so that extracted characteristics that are actually used are stored ahead of time in the analysis recipe 14, this information is transferred to the characteristic quantity extraction program 13, and characteristic quantities that are not used will not be used for determining quality, or the corresponding characteristic quantity extraction program 13 does not receive such information, or does not use it. Moreover, in cases where there are a plurality of methods for internal processing even with the same characteristic quantity extraction program 13, and these are selected and used, then just as above, it would also be possible to devise the system so that which processing to use is stored ahead of time in the analysis recipe 14, and this information is transferred to the identification program 15 in the actuation of the characteristic quantity extraction program 13.

EMBODIMENTS

Table 1 shows the recipes for characteristic quantity extraction stored in the analysis recipe 14 for MK cells (monkey kidney cells) and PC12 (rat phaeochromocytoma cells), while Table 2 shows the identification program 15 to be launched. In the case of MK cells, the characteristic quantities are the number of nuclei, the size of the cells, and the number of the vacuoles, but the nucleus count and cell size are both extracted by the same program A, which is a characteristic quantity extraction program 13. The number of vacuoles is extracted by a program B, which is a characteristic quantity extraction program 13. Then, a program X is used as the identification program 15.

In the case of PC12, the characteristic quantities are the number of nuclei, the size of the cells, the average length of the cytoplasmic protrusions, and the number of vacuoles, but the average length of the cytoplasmic protrusions and the number of vacuoles are both extracted by the same program D, which is a characteristic quantity extraction program 13. The number of nuclei is extracted by a program E, which is a characteristic quantity extraction program 13. A program C extracts the size of the detected cells. Then, a program Y is used as the identification program 15.

TABLE 1

| Type of cell | Characteristic quantity | Name of characteristic quantity extraction program |
|---|---|---|
| MK | Number of nuclei | Program A |
|  | Size of cells |  |
|  | Number of vacuoles | Program B |
| PC12 | Number of nuclei | Program E |
|  | Size of cells | Program C |
|  | Average length of cytoplasmic protrusions | Program D |
|  | Number of vacuoles |  |

TABLE 2

| Type of cell | Name of identification program |
|---|---|
| MK | Program X |
| PC12 | Program Y |

The identification programs determine the quality of the cells on the basis of the extracted characteristic quantities in accordance with the standards shown in Table 3 and Table 4.

TABLE 3

| Type of cell | Number of cells | Size of cells | Number of vacuoles | Quality determination |
|---|---|---|---|---|
| MK | 1 to 2 | 10 to 12 μ | None | Good |
|  | 1 to 2 | 10 to 12 μ | 1 or more | Somewhat poor |
|  | 3 or more |  |  | Poor |

TABLE 4

| Type of cell | Number of cells | Size of cells | Average length of cytoplasmic protrusions | Number of vacuoles | Quality determination |
|---|---|---|---|---|---|
| PC12 | 2 or more | 10 to 12μ | None | None | Poor |
|  | 1 | 10 to 12μ | 10μ | 1 or more | Somewhat poor |
|  | 1 | 10 to 12μ | 50μ | None | Good |

The invention claimed is:

1. A method for automatically determining a culture state of a cell from an image of the cell, the method comprising:
   receiving input of a type of cell to be analyzed;
   referring to a non-transitory recipe database that stores a plurality of different analysis recipes corresponding to different types of cells, wherein one of the analysis recipes is provided for each of the types of cells, and selecting an analysis recipe that corresponds to the type of cell to be analyzed based on the received input, wherein the analysis recipes store different combinations of characteristic extraction programs and quality determination programs, and each of the characteristic extraction programs is an image-processing program for extracting at least one characteristic concerning a culture state of the cell from a captured image of the cell;
   executing at least one characteristic extraction program that is contained in the selected analysis recipe, to extract at least one characteristic of the cell based on a captured image of the cell; and
   then executing a quality determination program that is contained in the selected analysis recipe to determine the quality of the cell from the extracted at least one characteristic.

2. The method according to claim 1, wherein the at least one characteristic comprises at least one of a growth state, a number of cells, a size of cells, a characteristic of an external shape of the cell, an adhesion between cells, a bondability between adjacent cells, a number of nuclei, a shape of the nuclei, a size of the nuclei, a number of nucleoli, a size of the nucleoli, a concentration of the nucleoli, an amount of cytoplasmic granules, a brightness of the cytoplasmic granules, a size of vacuoles, a number of the vacuoles, a shape of cytoplasmic protrusions, an occupied surface area, and a crowding situation.

3. The method according to claim 1, wherein the analysis recipe is at least one of rewritable and updatable.

4. A method for automatically determining a culture state of a cell from an image of the cell in an automatic cell culture apparatus that includes a memory storing a plurality of characteristic extraction programs, each of the characteristic extraction programs being an image-processing program for extracting at least one characteristic concerning a culture state of the cell from a captured image of the cell, a plurality of quality determination programs for determining the quality of the cell based on an extracted characteristic or a combination of extracted characteristics, and analysis recipes prepared for respective types of cells, wherein one of the analysis recipes is provided for each of the types of cells, the method comprising:

receiving input of a type of cell to be analyzed;

selecting an analysis recipe corresponding to the type of the cell to be analyzed based on the received input;

selecting, based on the selected analysis recipe, a combination of a part of the plurality of characteristic extraction programs and a part of the plurality of quality determination programs, the combination corresponding to the type of the cell, from the memory;

executing the part of the plurality of characteristic extraction programs to extract at least one characteristic of the cell; and then executing the part of the plurality of quality determination programs to determine the quality of the cell.

5. The method according to claim 4, wherein the at least one characteristic comprises at least one of a growth state, a number of cells, a size of cells, a characteristic of an external shape of the cell, an adhesion between cells, a bondability between adjacent cells, a number of nuclei, a shape of the nuclei, a size of the nuclei, a number of nucleoli, a size of the nucleoli, a concentration of the nucleoli, an amount of cytoplasmic granules, a brightness of the cytoplasmic granules, a size of vacuoles, a number of the vacuoles, a shape of cytoplasmic protrusions, an occupied surface area, and a crowding situation.

6. The method according to claim 4, wherein one characteristic extraction program is stored in the memory for each of the different characteristics.

7. The method according to claim 4, wherein at least one of the characteristic extraction programs extracts a plurality of different characteristics.

8. The method according to claim 4, wherein one of the quality determination programs is applicable to a plurality of cell types.

9. The method according to claim 4, wherein the analysis recipes are rewritable.

10. The method according to claim 1, wherein:

executing the quality determination program comprises performing a comparison between the extracted at least one characteristic, and at least one threshold value for the extracted at least one characteristic; and the quality of cell is automatically determined based on a result of the comparison.

11. The method according to claim 4, wherein:

executing the part of the plurality of quality determination programs comprises performing a comparison between the extracted at least one characteristic, and at least one threshold value for the extracted at least one characteristic; and the quality of the cell is automatically determined based on a result of the comparison.

* * * * *